Figure 1:
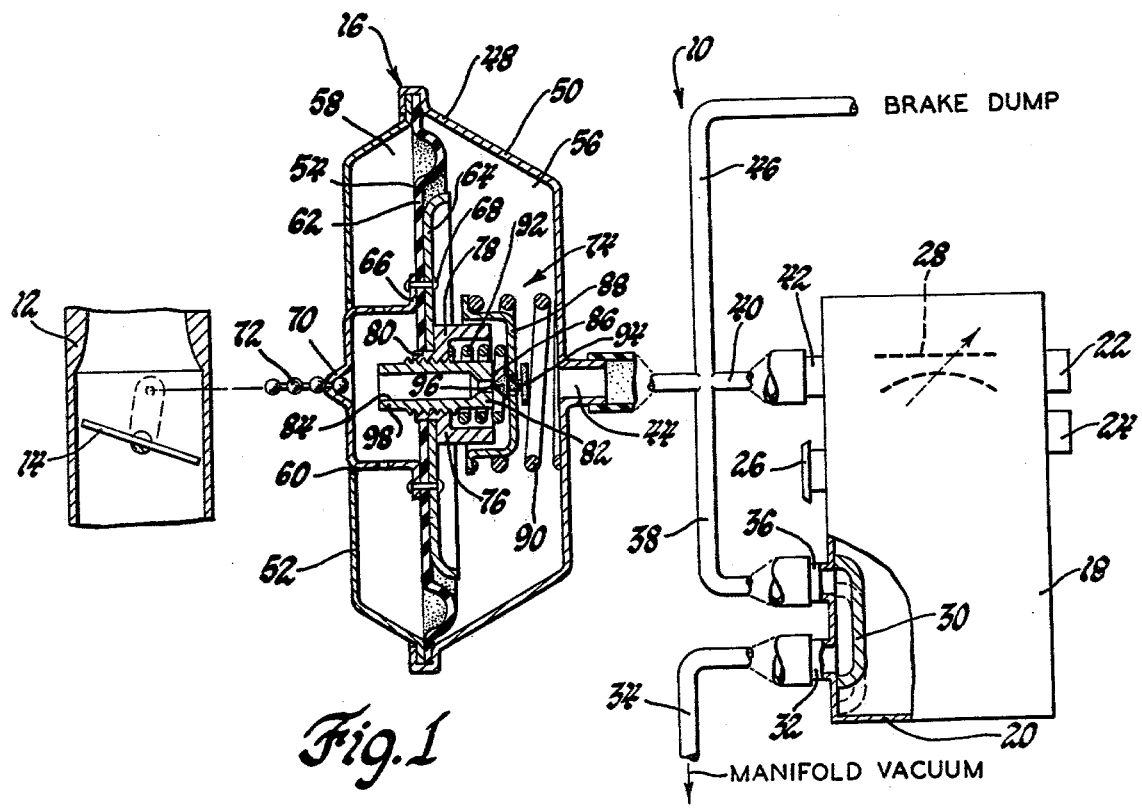

United States Patent [19]

Riddel

[11] 4,217,969
[45] Aug. 19, 1980

[54] POSITION FEEDBACK VALVE ASSEMBLY AND SERVO MOTOR INCORPORATING SAME

[75] Inventor: John W. Riddel, Fenton, Mich.

[73] Assignee: General Motors Corporation, Detroit, Mich.

[21] Appl. No.: 969,699

[22] Filed: Dec. 15, 1978

[51] Int. Cl.² .............................................. B60K 31/00
[52] U.S. Cl. .................................... 180/175; 123/319; 251/61.3; 251/61.4
[58] Field of Search ....................... 180/175, 176, 177; 123/103 R, 103 B; 251/61.3, 61.4, 61.2

[56] References Cited

U.S. PATENT DOCUMENTS

| | | |
|---|---|---|
| 3,125,178 | 3/1964 | Stoltman et al. |
| 3,441,104 | 4/1969 | Hagler |
| 3,451,651 | 6/1969 | Rood |
| 4,105,088 | 8/1978 | Levijoki |
| 4,130,267 | 12/1978 | Inada et al. ......................... 251/61.2 |

Primary Examiner—Charles A. Marmor
Attorney, Agent, or Firm—D. D. McGraw

[57] ABSTRACT

A vehicle road speed control system is provided with a position feedback valve sensing position of the system servomotor power wall to modify the vacuum signal acting on the servomotor. One embodiment uses such a valve to control atmospheric air bleed, and another embodiment uses such a valve to control the vacuum supply.

2 Claims, 2 Drawing Figures

POSITION FEEDBACK VALVE ASSEMBLY AND SERVO MOTOR INCORPORATING SAME

The invention relates to a valve assembly for controlling the flow of a fluid therethrough in accordance with the position of a servomotor power wall, the operating pressure of the servomotor being modified by action of the valve assembly. A power unit incorporating the invention is provided with a servomotor power wall position sensitive opening which obtains accurate, reliable control of the servomotor in an inexpensive manner. The valve assembly embodying the invention uses two springs in series having spring rates such that as the one is compressed by some large amount, the other is compressed in proportion to the first but to a much lesser extent. The intersection of the two springs carries or drives a valve member so that the valve opening is in direct proportion to the compression of the spring arrangement. In one embodiment the valve assembly modifies air to a vehicle road speed control servomotor as an air valve. In another embodiment of the invention, the valve assembly modifies the air in the vacuum circuit supplying the servomotor. In either arrangement the varying of the orifice admitting air through the valve assembly operates in accordance to the power unit power wall position, which is reflective of the vehicle engine throttle position.

In the Drawing

Figure 2:
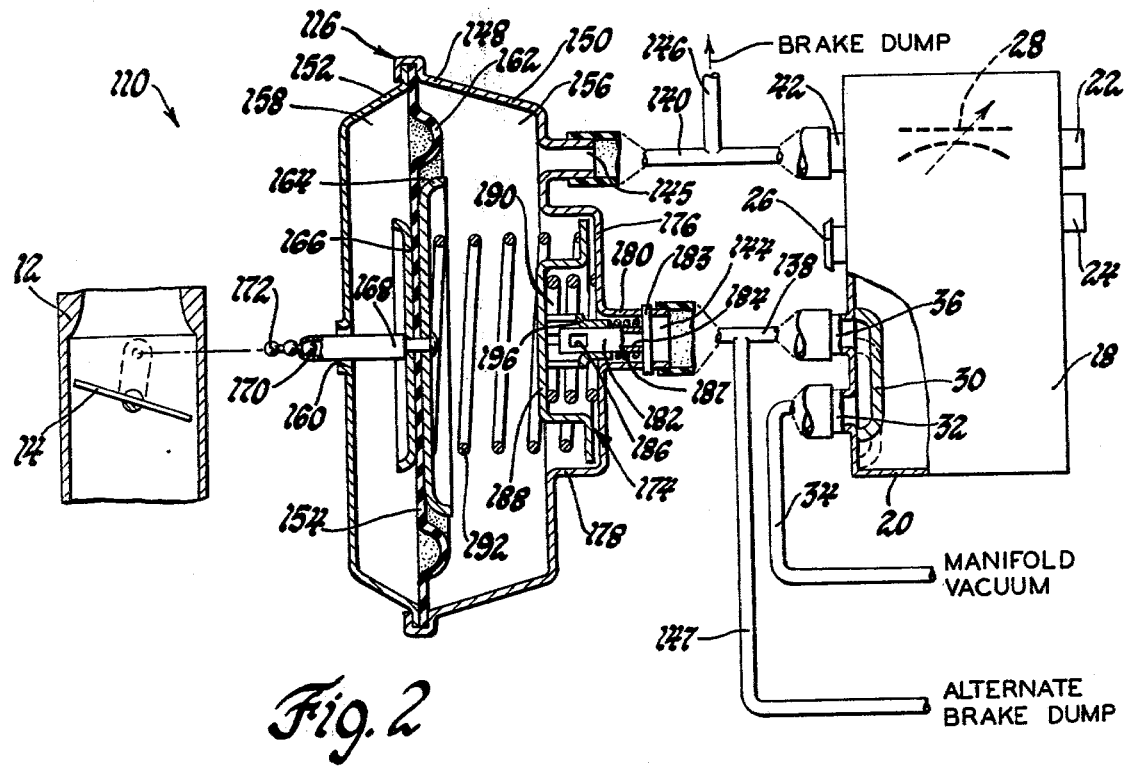

FIG. 1 is a schematic illustration of a vehicle road speed control system embodying the invention, with part broken away and in section; and FIG. 2 is a schematic representation of a modification of the invention as illustrated in FIG. 1, with part broken away and in section.

The vehicle road speed control system 10 of FIG. 1 is illustrated as being connected to the vehicle engine 12 so as to control the engine throttle mechanism illustrated as a throttle valve 14 and associated linkage. It is to be understood that throttle valve 14 is spring biased toward the closed throttle position illustrated. The vehicle operator opens the throttle valve by movement of the accelerator pedal and associated linkage, as is well known in the art. The system also includes the servomotor 16, the vehicle speed transducer 18, and associated linkage and conduits. The transducer 18 may be of the type disclosed in U.S. Pat. No. 3,441,104 entitled "Vehicle Speed Transducer" and issued Apr. 29, 1969. The system is connected to receive engine intake manifold vacuum and is also connected to a portion of the brake system to provide for dumping the system when the brakes are actuated. Such connections and provisions are also well known in the art and are not illustrated in detail.

The transducer 18 is somewhat schematically illustrated as having a housing 20 provided with speedometer drive inlet connection 22 and a speedometer drive outlet connection 24. The housing is provided with an atmospheric air inlet 26, and includes a variable control valve 28 and a vacuum switching valve 30. A port 32 is connected to a conduit 34 which receives vacuum from a suitable vacuum source such as the engine intake manifold. Another port 36 is connected by conduit 38 to a conduit 40. Conduit 40 connects a port 42 of transducer 18 with the port 44 of the servomotor 16. Another conduit 46 is also connected to conduit 40 and leads to a brake actuated dump valve, not illustrated. The dump valve is normally closed, but is opened when the brake system is actuated. The operation of the transducer 18, including control valve 28 and vacuum switching valve 30, are more fully explained in the above-identified patent and reference is made to that patent for the detailed operation of a transducer of this type.

Servomotor 16 has a housing 48 formed by fixed walls 50 and 52. A movable power wall 54 is secured in housing 48 so as to divide the housing into a variable pressure chamber 56 and a constant pressure chamber 58. Fixed wall 52 has an opening 60 which admits air from the atmosphere into chamber 58. Therefore chamber 58 is constantly at atmospheric pressure. Power wall 54 includes a flexible diaphragm 62, a pressure plate 64 on one side of the diaphragm exposed to variable pressure chamber 56, and another pressure plate 66 on the other side of the diaphragm and located in constant pressure chamber 58. Suitable fastening means 68 hold the pressure plates together and attach them to the diaphragm 62. Pressure plate 66 is illustrated as being somewhat hat-shaped so that it extends into opening 60 of fixed wall 52 and provides a connection 70 for the flexible link 72. The flexible link is illustrated as being a flexible chain which is attached to a suitable portion of the throttle linkage so that a tensile force exerted on the flexible link by the servomotor will urge the throttle valve 14 toward the open position. When there is no tensile force exerted on link 72, the throttle valve is controlled only by the throttle linkage, including the operator controlled accelerator pedal and the throttle valve closing spring.

The valve assembly 74 embodying the invention is illustrated in FIG. 1 as being attached to and supported by the movable power wall 54. The housing section 76 is formed with an enlarged cylindrical portion 78 and a smaller boss-like portion 80. The boss-like portion 80 extends through an opening provided in power wall 54. The housing section is firmly secured to the power wall. The enlarged cylindrical portion 78 extends from the power wall into the variable pressure chamber 56. A first valve member 82 provides the valve seat for the valve assembly and has a somewhat tubularlike construction. A fluid flow passage 84 extends through the first valve member 82. Valve member 82 is suitably secured in the valve assembly housing section 76, being illustrated in FIG. 1 as having a threaded connection which provides for calibration. The end of fluid flow passage 84 opening into variable pressure chamber 56 defines the valve seat 86. The portion of valve member 82 surrounding valve seat 86 is contained within the enlarged cylindrical portion 78 of the housing section 76 and spaced radially inwardly from that housing portion. A spring seat 88 is positioned within chamber 56 in movable relation to the valve assembly housing section 76. A first spring 90 has one end acting on spring seat 88 and the other end acting on fixed wall 50 of housing 48, urging the spring seat 88 toward the valve assembly housing section 76 and the first valve member 82. A second spring 92 is positioned in the annular space between the first valve member 82 and the large cylindrical portion 78 and extends beyond the housing section 76 to engage the other side of spring seat 88 so that the first spring 90 and the second spring 92 act in opposing relation on the movable spring seat 88. An opening 94 is formed in spring seat 88 and is axially aligned with the fluid flow passage 84 and valve seat 86. The opening receives a second valve member 96 therein which cooperates with the first valve member 82 to provide the control valve of the valve assembly 74. Second valve member 96 is illustrated as being loosely mounted in opening 94 and having slight axial movement relative to the spring seat 88. It is noted that when the spring seat 88 is moved sufficiently toward the first valve member 82, the second valve member will cooperate with valve seat 86 to modulate the flow of air through the valve assembly. First spring 90 operates as a power wall return spring, acting operatively on the power wall through spring seat 88, second spring 92, and the valve housing section 76. Springs 90 and 92 have spring rates such that as spring 90 is compressed by some large amount, spring 92 is compressed in proportion to the first spring but to a much lesser extent. For example, spring 90 may have a spring rate of one pound per inch and spring 92 may have a spring rate of eight pounds per inch. Therefore a load of one pound will compress the first spring 90 one inch and the second spring 92 by ⅛ inch. The spring seat 88, which is the intersection of the two springs, therefore carries and drives the second valve member 96 so that the opening of the valve is in direct proportion to the compression of the spring arrangement. It is noted that the end 98 of fluid flow passage 84 opens inside the pressure plate 66, which forms a part of the constant pressure chamber 58 and therefore is at atmospheric pressure.

When the system is at rest, springs 90 and 92 are expanded and the power wall 54 is in the leftward portion of the servomotor 16 as viewed in FIG. 1. Actuation of the road speed control system 10 causes the vacuum switching valve 30 to be moved to the position shown in solid lines in FIG. 1, connecting vacuum from the vacuum source with the conduit 38 and therefore with the variable pressure chamber 56 of the servomotor. The control valve 28 of the transducer 18 admits a controlled amount of atmospheric air into the variable pressure chamber 56 through conduit 40. In addition, since the valve member 96 is spaced from its valve seat 86, atmospheric air also bleeds through the valve assembly 74 into the variable pressure chamber 56. A subatmospheric pressure is imposed in chamber 56, setting up a pressure differential across power wall 54 and causing the power wall to move rightwardly as seen in FIG. 1. This movement compresses springs 90 and 92, as above described, causing valve member 96 to restrict the opening between that valve member and its seat 86, modulating the atmospheric bleed through the valve assembly 74 in accordance with the position of power wall 54. Since power wall 54 is connected to the throttle valve 14 by flexible link 72 and the throttle linkage, this position also reflects the amount of opening of the throttle valve 14 when that opening is being controlled by the servomotor. Upon sufficient rightward movement of power wall 54, valve member 96 may engage valve seat 86 and completely close off the atmospheric bleed through the valve assembly 74. This arrangement provides improved system performance as compared to a vacuum powered road speed control system without such an arrangement. The improved performance is the result of decrease variation in gain and the elimination of overrun, which would result from the inability of the system to completely release the throttle.

The modified arrangement shown in FIG. 2 provides for varying a vacuum supply orifice in accordance with the position of the power wall of the servomotor.

The vehicle road speed control system 110 of FIG. 2 is illustrated as being connected to the vehicle engine 12 so as to control the engine throttle mechanism including throttle valve 14 and associated linkage. The system includes the servomotor 116, the vehicle speed transducer 18, and associated linkage and conduits. The transducer 18 may be of the same type discussed above. The system is connected to receive engine intake manifold vacuum and is also connected to a portion of the brake system to provide for dumping the system when the brakes are actuated. Such connections and provisions are also well known in the art and are not illustrated in detail.

The transducer 18 is somewhat schematically illustrated as having a housing 20 provided with speedometer drive inlet connection 22 and a speedometer drive outlet connection 24. The housing is provided with an atmospheric air inlet 26, and includes a variable control valve 28 and a vacuum switching valve 30. A port 32 is connected to a conduit 34 which receives vacuum from a suitable vacuum source such as the engine intake manifold. Another port 36 is connected by conduit 138 to port 144 of the servomotor 116. Conduit 140 connects a port 42 of transducer 18 with the port 145 of the servomotor 116. Another conduit 146 is also connected to conduit 140 and leads to a brake actuated dump valve, not illustrated. The dump valve is normally closed, but is opened when the brake system is actuated. A conduit 147, connected to conduit 138, may lead to an alternate brake dump valve, not illustrated.

Servomotor 116 has a housing 148 formed by fixed walls 150 and 152. A movable power wall 154 is secured in housing 148 so as to divide the housing into a variable pressure chamber 156 and a constant pressure chamber 158. Fixed wall 152 has an opening 160 which admits air from the atmosphere into chamber 158. Therefore chamber 158 is constantly at atmospheric pressure. Power wall 154 includes a flexible diaphragm 162, a pressure plate 164 on one side of the diaphragm exposed to variable pressure chamber 156, and another pressure plate 166 on the other side of the diaphragm and located in constant pressure chamber 158. Suitable fastening means 168 hold the pressure plates and diaphragm together. Fastening means 168 also provides a connection 170 for the flexible link 172. The flexible link is illustrated as being a flexible chain which is attached to a suitable portion of the throttle linkage so that a tensile force exerted on the flexible link by the servomotor will urge the throttle valve 14 toward the open position. When there is no tensile force exerted on link 72, the throttle valve is controlled only by the throttle linkage, including the operator controlled accelerator pedal and the throttle valve closing spring.

The valve assembly 174 embodying the invention is illustrated in FIG. 2 as being mounted on housing fixed wall 150. The valve housing section 176 is formed as a part of fixed wall 150 and includes an enlarged cylindrical portion 178 and a smaller boss-like portion 180. A first valve member 182 provides one valve element of the valve assembly and is an orifice tube mounted in valve housing portion 180 by pin 183. A fluid flow passage 184 is formed by first valve member 182. The portion of fluid flow passage 184, providing an opening into variable pressure chamber 156, is formed as a side wall orifice 186. The portion of valve member 182 contained within the boss-like portion 180 of the housing section 176 is spaced radially inwardly from that housing portion. Pin 183 also provides a spring seat for a valve spring 187 positioned within housing portion 180 and receiving the first valve member therethrough. A spring seat 188 is positioned within chamber 156 in movable relation to valve housing section 176. A first spring 190 has one end acting on spring seat 188 and the other end acting on fixed wall 150 of housing 148, urging the spring seat 188 toward the power wall 154 and away from the first valve member 182. A second spring 192 is positioned in chamber 156 between the power wall 154 and the spring seat 188 so that the first spring 190 and the second spring 192 act in opposing relation on the movable spring seat 188. The side of spring seat 188 engaged by spring 190 has a second valve member 196 thereon which cooperates in telescoping relation with the first valve member 182 to provide the control valve of the valve assembly 174. Valve member 196 is engaged by valve spring 187 which holds valve member 196 in engagement with spring seat 188. Second valve member 196 is illustrated as being castellated on the end engaged by spring seat 188. When the spring seat 188 and valve member 196 are moved relative to the first valve member 182, the second valve member 196 will cooperate with valve orifice 186 to modulate the flow of air through the valve assembly. Springs 190 and 192 operate as a power wall return spring means, acting on the power wall 154 and the fixed wall 150 through spring seat 188. Springs 190 and 192 have spring rates such that as spring 192 is compressed by some large amount, spring 190 is compressed in proportion to the spring 192 but to a much lesser extent. For example, spring 192 may have a spring rate of one pound per inch and spring 190 may have a spring rate of eight pounds per inch. Therefore a load of one pound will compress spring 192 one inch and spring 190 by ⅛ inch. The spring seat 188, which is the intersection of the two springs, therefore carries and drives the second valve member 196 so that the opening of the valve is in direct proportion to the compression of the spring arrangement.

When the system is at rest, springs 190 and 192 are expanded and the power wall 54 is in the leftward portion of the servomotor 116 as viewed in FIG. 2. Actuation of the road speed control system 110 causes the vacuum switching valve 30 to be moved to the position shown in solid lines in FIG. 2, connecting vacuum from the vacuum source with the conduit 138 and therefore with the variable pressure chamber 156 of the servomotor through the slightly open valve assembly 174. The control valve 28 of the transducer 18 admits a controlled amount of atmospheric air into the variable pressure chamber 156 through conduit 140. A subatmospheric pressure is imposed in chamber 156, setting up a pressure differential across power wall 154 and causing the power wall to move rightwardly as seen in FIG. 2. This movement compresses springs 190 and 192, as above described, causing valve member 196 to further open the orifice 186 of valve member 182, modulating the vacuum bleed through the valve assembly 174 in accordance with the position of power wall 154. Since power wall 154 is connected to the throttle valve 14 by flexible link 172 and the throttle linkage, this position also reflects the amount of opening of the throttle valve 114 when that opening is being controlled by the servomotor.

The embodiments of the invention in which an exclusive property or privilege is claimed are defined as follows.

1. A vehicle road speed servomotor adapted to control a vehicle engine throttle mechanism and thus control vehicle speed when the servomotor is power operated, said servomotor comprising: a housing having a fixed wall and movable power wall defining therewith a variable pressure chamber on one power wall side and a constant pressure chamber on the other power wall side so that a pressure differential may be selectively established across said power wall to power operate said servomotor, said power wall being adapted to control a vehicle engine throttle mechanism and thus control vehicle road speed when said servomotor is power operated; power wall return spring means operatively positioned between and acting on said power wall and said housing and continually urging said power wall in a direction tending to close the engine throttle; a valve assembly including a first valve member having a fluid flow passage therethrough opening into said variable pressure chamber, a second valve member movable relative to and cooperable with said first valve member to vary the effective opening of said fluid flow passage and effectively control fluid flow therethrough within a predetermined fluid flow range, a spring seat having one of said valve members thereon and movable to move said one valve member relative to the other of said valve members, a first spring having one end acting on said spring seat and the other end acting on one of said walls and being loaded in compression to act through said spring seat and urge said one of said valve members in a direction tending to close said fluid flow passage, and a second spring acting on said spring seat and controlling the urging of said one of said valve members in a direction tending to open said fluid flow passage, one of said first and second springs also operatively acting on said power wall and having a spring rate which is substantially different from the other of said first and second springs, said power wall return spring means including said one of said first and second springs;

said valve assembly acting during servomotor power operation to maintain the amount of opening of said fluid flow passage in direct proportion to the compression of said first and second springs so that the movement of said one of said valve members is always substantially less than and in proportion to the movement of said power wall.

2. A valve assembly for controlling the flow of a fluid therethrough in accordance with the position of a servomotor power wall, the operating pressure of which is modified by action of the valve assembly, said valve assembly comprising:

a first valve member having a fluid flow passage therethrough;

a second valve member movable relative to and cooperable with said first valve member to vary the effective opening of said fluid flow passage and effectively control fluid flow therethrough within a predetermined fluid flow range;

a first spring urging one of said valve members in a direction tending to close said passage;

a second spring controlling the urging of one of said valve members in a direction tending to open said passage;

and means adapted to be responsive to position of a servomotor power wall for loading said springs accordingly and establishing a position variable valve opening;

said springs having spring rates such that as one is compressed by said loading means by a predetermined amount the other is compressed in proportion thereto but by a much lesser predetermined amount.

* * * * *